(12) United States Patent
Sacks et al.

(10) Patent No.: US 10,698,957 B1
(45) Date of Patent: Jun. 30, 2020

(54) SYSTEM, METHOD, AND COMPUTER PROGRAM FOR MANAGING COLLABORATIVE DISTRIBUTED DOCUMENT STORES WITH MERGE CAPABILITIES, VERSIONING CAPABILITIES, HIGH AVAILABILITY, CONTEXT AWARE SEARCH, AND GEO REDUNDANCY

(71) Applicant: Amdocs Development Limited, Limassol (CY)

(72) Inventors: Zohar Sacks, Kfar Saba (IL); Sergei Liakhovetsky, Ra'anana (IL); Shalom Y. Berman, Lod (IL); Tali Grama Strugo, Kadima-Zoran (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 193 days.

(21) Appl. No.: 15/824,860

(22) Filed: Nov. 28, 2017

Related U.S. Application Data

(60) Provisional application No. 62/428,996, filed on Dec. 1, 2016.

(51) Int. Cl.
*G06F 16/93* (2019.01)
*H04L 29/06* (2006.01)
(Continued)

(52) U.S. Cl.
CPC ............. *G06F 16/93* (2019.01); *G06F 16/13* (2019.01); *G06F 16/176* (2019.01);
(Continued)

(58) Field of Classification Search
CPC .. G06F 21/10; G06F 2221/2151; G06F 16/93; G06F 16/219; G06F 2221/2141;
(Continued)

(56) References Cited

U.S. PATENT DOCUMENTS

2005/0216522 A1* 9/2005 Gomes ................. G06F 16/284
707/999.201
2008/0209142 A1* 8/2008 Obernuefemann ..........................
G06F 11/1456
711/161
(Continued)

*Primary Examiner* — Yuk Ting Choi
(74) *Attorney, Agent, or Firm* — Zilka-Kotab, P.C.

(57) ABSTRACT

A system, method, and computer program product are provided for managing collaborative distributed document stores with merge capabilities, versioning capabilities, high availability, context aware search, and geo redundancy. In operation, a system identifies at least one document for a plurality of users to collaborate work. The system defines user roles for the plurality of users associated with the at least one document, the user roles including at least one owner role and one or more viewer roles or contributor roles. The system utilizes downstream synchronization schematics, fast-forward merge techniques and easy versioning based on change-set management, and loose timestamp oriented versioning based on data branching to give an owner assigned to the at least one document an ability to invite collaborators to collaborate on work associated with the at least one document in a managed and organized manner via a collaborative distributed document store with merge capabilities, versioning capabilities, context aware search capabilities, high availability, and geo redundancy.

20 Claims, 6 Drawing Sheets

(51) Int. Cl.
   *H04L 29/08*      (2006.01)
   *G06F 16/13*      (2019.01)
   *G06F 16/22*      (2019.01)
   *G06F 16/176*     (2019.01)
   *G06F 16/178*     (2019.01)
   *G06F 40/186*     (2020.01)
   *G06F 40/197*     (2020.01)

(52) U.S. Cl.
   CPC ............ *G06F 16/178* (2019.01); *G06F 16/22* (2019.01); *G06F 40/186* (2020.01); *G06F 40/197* (2020.01); *H04L 65/403* (2013.01); *H04L 67/306* (2013.01)

(58) Field of Classification Search
   CPC . G06F 16/2308; G06F 16/2358; G06F 16/951
   See application file for complete search history.

(56) References Cited

U.S. PATENT DOCUMENTS

| | | | |
|---|---|---|---|
| 2008/0270820 A1* | 10/2008 | Kondo | G06F 11/2028 714/2 |
| 2009/0024609 A1* | 1/2009 | Barker | G06F 21/6227 707/999.005 |
| 2017/0053025 A1* | 2/2017 | De Sousa Webber | G06F 16/3347 707/999.005 |
| 2017/0220546 A1* | 8/2017 | Codrington | G06F 3/0484 707/999.005 |

\* cited by examiner

SYSTEM, METHOD, AND COMPUTER PROGRAM FOR MANAGING COLLABORATIVE DISTRIBUTED DOCUMENT STORES WITH MERGE CAPABILITIES, VERSIONING CAPABILITIES, HIGH AVAILABILITY, CONTEXT AWARE SEARCH, AND GEO REDUNDANCY

CLAIM OF PRIORITY AND RELATED APPLICATIONS

This application claims the benefit of U.S. Provisional Application No. 62/428,996, filed Dec. 1, 2016, the entire contents of which are incorporated herein by reference.

FIELD OF THE INVENTION

The present invention relates to managing a collaborative document store, and more particularly to managing collaborative distributed document stores with merge capabilities, versioning capabilities, high availability, context aware search, and geo redundancy.

BACKGROUND

The ability for users to collaborate on items constructed of documents and editing is important to ensure various experts are able to make contributions to such process. One challenge with this collaborative effort is the ability to maintain and merge updated versions of such documents. Currently, there are no document or key value stores that maintain collaboration capabilities at an item level with versioning merging and search capability at the system level.

There is thus a need for addressing these and/or other issues associated with the prior art.

SUMMARY

A system, method, and computer program product are provided for managing collaborative distributed document stores with merge capabilities, versioning capabilities, high availability, context aware search, and geo redundancy. In operation, a system identifies at least one document for a plurality of users to collaborate work. The system defines user roles for the plurality of users associated with the at least one document, the user roles including at least one owner role and one or more viewer roles or contributor roles. The system utilizes downstream synchronization schematics, fast-forward merge techniques and easy versioning based on change-set management, and loose timestamp oriented versioning based on data branching to give an owner assigned to the at least one document an ability to invite collaborators to collaborate on work associated with the at least one document in a managed and organized manner via a collaborative distributed document store with merge capabilities, versioning capabilities, context aware search capabilities, high availability, and geo redundancy.

DETAILED DESCRIPTION

Figure 1:
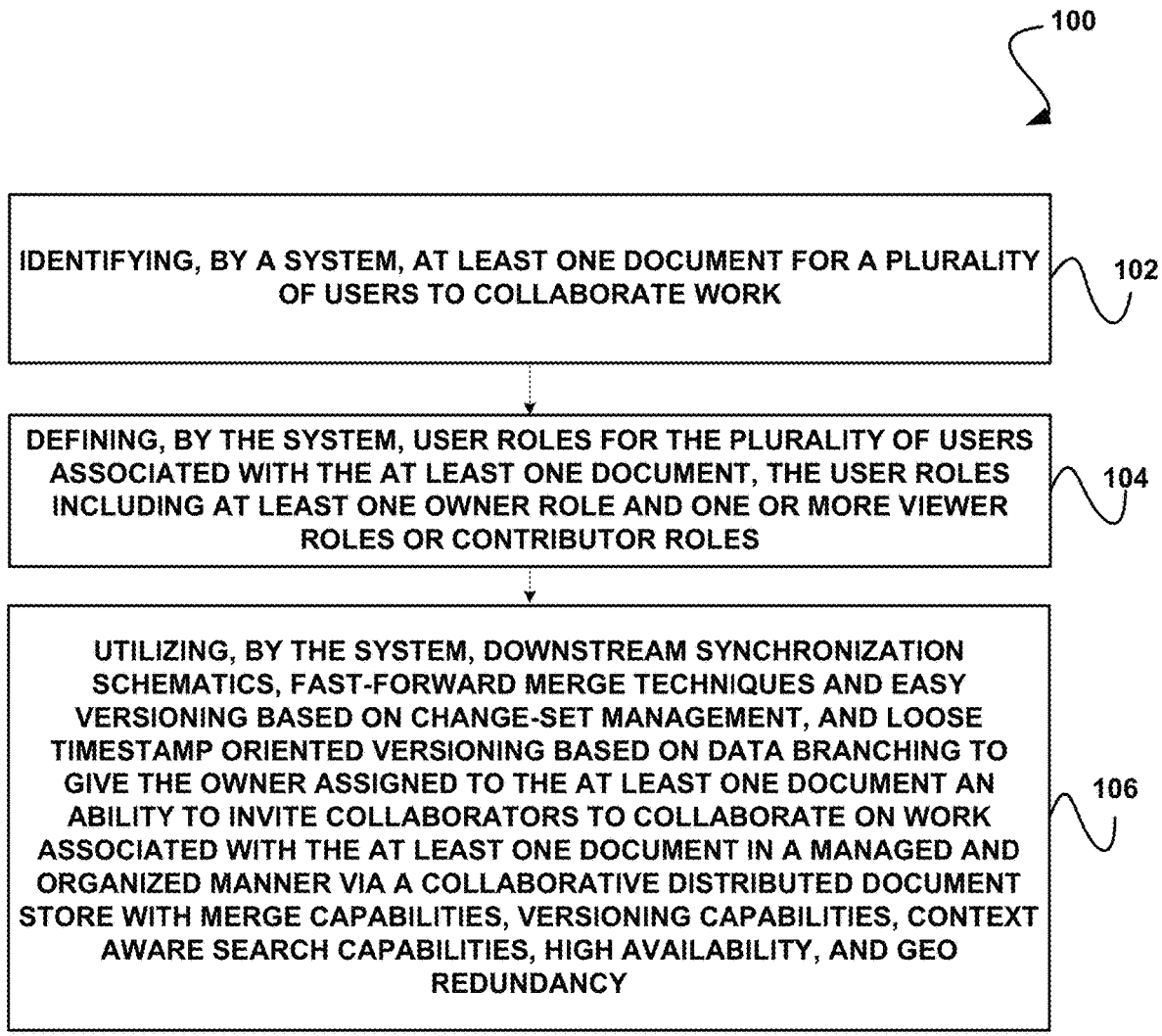
FIG. 1 illustrates a method for managing collaborative distributed document stores with merge capabilities, versioning capabilities, high availability, context aware search, and geo redundancy, in accordance with one embodiment.

FIG. 1 illustrates a method 100 for managing collaborative distributed document stores with merge capabilities, versioning capabilities, high availability, context aware search, and geo redundancy, in accordance with one embodiment. A document-oriented database, or document store, is a computer program designed for storing, retrieving and managing document-oriented information, also known as semi-structured data.

In operation, a system identifies at least one document for a plurality of users to collaborate work. See operation 102. The document may include any type of document. For example, in various embodiments, the document may include a text document, a spreadsheet document, a drawing document, and/or any other type of document.

The system defines user roles for the plurality of users associated with the at least one document, the user roles including at least one owner role and one or more viewer roles or contributor roles. See operation 104. The owner role indicates a user that is responsible for the documents. The viewer role indicates a user is allowed to view the documents. The contributor role indicates a user is allowed to contribute by editing, commenting, deleting, and/or otherwise contributing to the document.

The system utilizes downstream synchronization schematics, fast-forward merge techniques and easy versioning based on change-set management, and loose timestamp oriented versioning based on data branching to give the owner assigned to the at least one document an ability to invite collaborators to collaborate on work associated with the at least one document in a managed and organized manner via a collaborative distributed document store with merge capabilities, versioning capabilities, context aware search capabilities, high availability, and geo redundancy. See operation 106.

In one embodiment, the system may construct items from one or more entities included in the documents or the actual documents. Users collaborate on items and items are constructed of documents. An item may refer to a document, a group of documents, and/or document entities, some of which are of type entity and some of type document. The system may include an index for free text context aware searches for documents and items.

Thus, in one embodiment, the system may include the collaborative distributed document/data store, an index for fast free text context aware searches, and a state store to maintain user roles, collaboration groups, and/or item assignments.

The collaborative distributed document store may provide the system with the mechanisms to enable working in collaboration. In one embodiment, this capability may be accomplished by implementing and utilizing schema free documents, atomic user work area creation, merge functionality, and/or versioning/history.

It should be noted that the method 100 may be implemented utilizing various systems, hardware, software, applications, user interfaces, etc., as dictated by the implementer. For example, the system implementing the method 100 (e.g. the management system of FIG. 2, etc.) may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
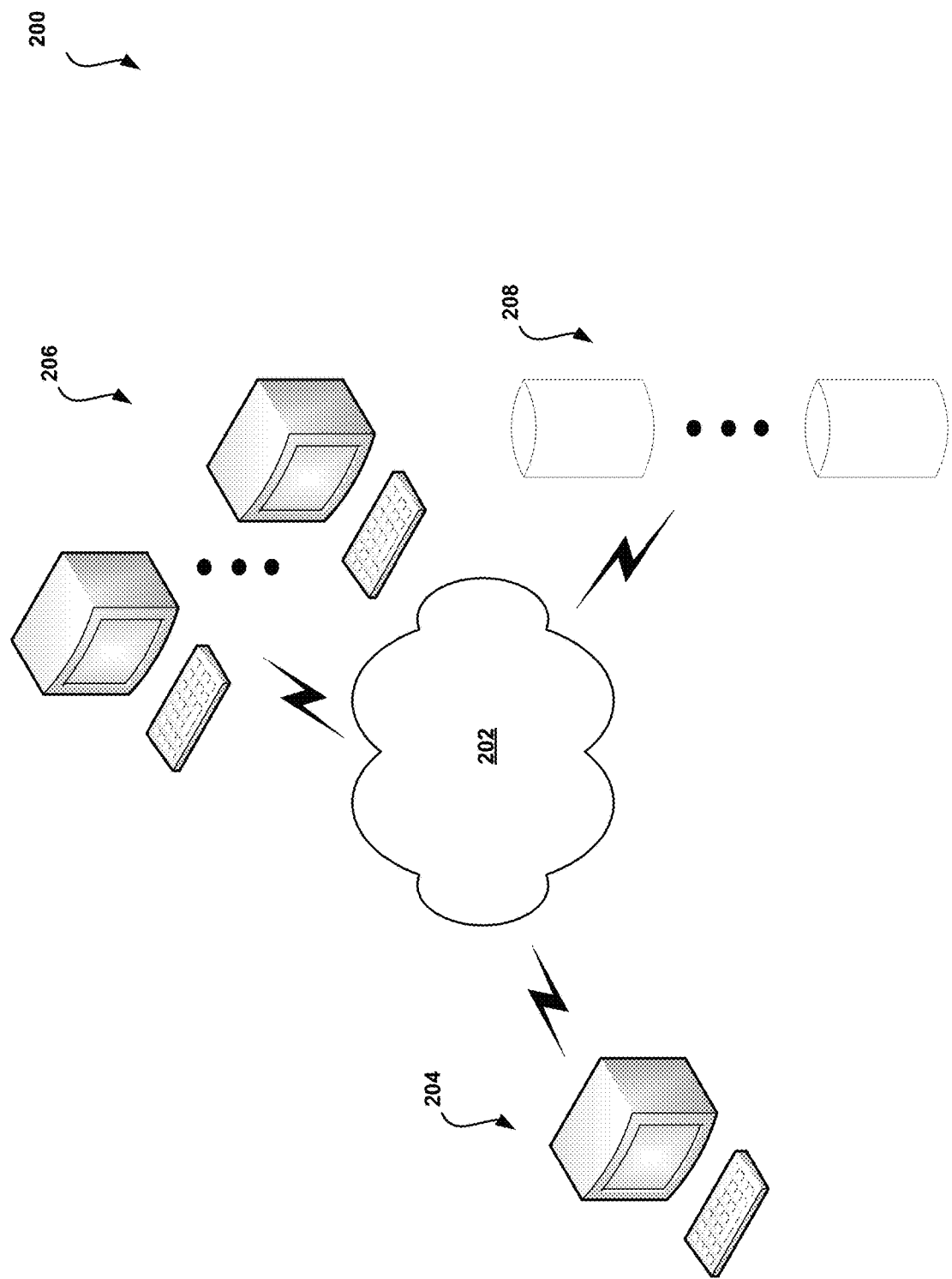
FIG. 2 shows a system for managing collaborative distributed document stores with merge capabilities, versioning capabilities, high availability, context aware search, and geo redundancy, in accordance with one embodiment.

FIG. 2 shows a system 200 for managing collaborative distributed document stores with merge capabilities, versioning capabilities, high availability, context aware search, and geo redundancy, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a management system 204, which may implement a variety of applications or software, etc. The management system 204 may be capable of communicating with a plurality of other user systems 206, either directly or over one or more networks 202, for managing document collaboration.

The management system 204 is also in communication with one or more repositories/databases 208, which may serve as a storage area for documents on which users are actively collaborating. The management system 204 is also in communication with (or may include) a collaboration database.

The management system 204 manages a document collaborative store where users can work in collaboration on parts of an item without interfering with one another and where such users can automatically merge their work to a shared copy and share their progress. To do this, the management system 204 may define three user roles and give the owner of an item the ability to invite collaborators to work with the owner on the item. To achieve this collaboration, the management system 204 utilizes downstream synchronization schematics, fast-forward merge and easy versioning based on change-set management, and loose timestamp oriented versioning based on data branching (e.g. no semantic versioning).

Figure 3:
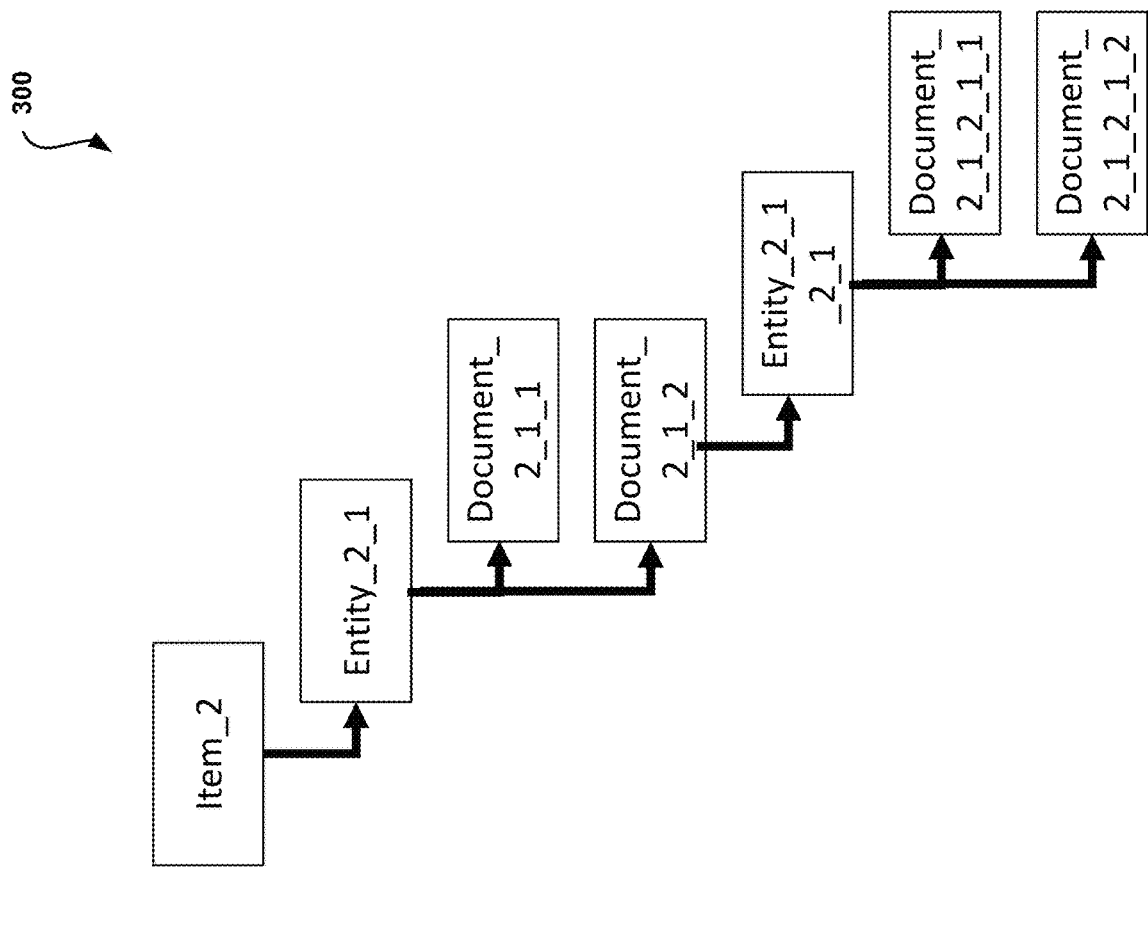
FIG. 3 shows a data model capable of being used for managing collaborative distributed document stores, in accordance with one embodiment.
Figure 3:
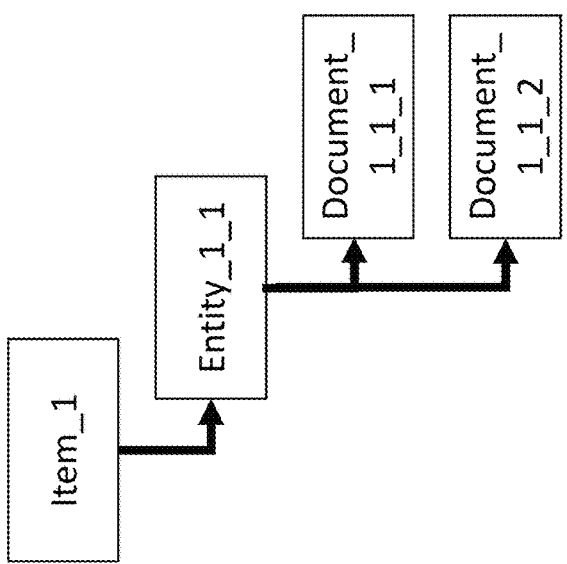

FIG. 3 shows a data model 300 capable of being used for managing collaborative distributed document stores, in accordance with one embodiment. As an option, the data model 300 may be implemented in the context of the details of the previous figures and/or any subsequent figure(s). Of course, however, the data model 300 may be implemented in the context of any desired environment. Further, the aforementioned definitions may equally apply to the description below.

Logically, the management system constructs Items, each one constructed from one or more entities or documents. Each entity is constructed from one or more documents. An item is a group of documents, some of which are of type entity and some of type document.

Logically the entity and/or document can contain a nested entity (and in turn this entity may contain one or more entities and documents). The management system maintains this infinite nesting using the "contains" relation between documents.

In one embodiment, the management system may include four main parts/aspects: 1) a collaborative distributed data store; 2) an index for fast free text context aware searches; 3) a state store to maintain user roles, collaboration groups, and item assignments; and 4) an atomic operations enforcer.

The collaborative distributed data store (i.e. the collaboration database) is the system's data store that provides the system with the mechanisms to enable working in collaboration. In one embodiment, this capability may be based on four pillars: 1) schema free documents; 2) atomic user work area operations; 3) merge; and 4) versioning/history.

With respect to schema free documents, the collaboration database (DB) used by (or included with, etc.) the management system may not be aware of the content of the data it holds and can hold any data type and volume. In some embodiments, the collaboration database may have certain limitations on data volume.

With respect to atomic user work area creation, each user needs the ability to work on a copy (e.g. break, make, test, etc.) without fear of breaking another user's work. To achieve this, the collaboration database creates, for each item collaborator (and owner), a private work area with a copy of the item. The work area creation must be atomic and based on a version (e.g. usually the latest version). For performance reasons, the work area may provide copy-on-write change management and incremental accounting of changes.

With respect to merging (which is atomic), when a user shares an associated work area back to the main copy, the collaboration database will merge the new change set to the main copy. The merge will support fast-forward merging (e.g. when possible merger without user intervention) and an application programming interface (API) for conflict resolution (e.g. optionally manual, when fast-forward failed). To maintain the main copy data integrity, the collaboration database supports downstream merges (i.e. merging into a user's working area), resolving conflicts that the fast-forward merge algorithm could not handle and only then try again to merge up-stream back to a main item. It is worth noting that if the main item was changed during this process, the merge should start again. The merge may be performed in the document level. If a merge is performed at document or item level, the merge will be recursive.

With respect to versioning/history, efficient and safe collaboration on the same item is achieved by strong versioning/history management. Each change set to a document group (e.g. sized one or more documents) in the work area is marked as a revision and has an associated unique revision ID. When a set of change sets is being shared to the main copy, the revisions are added to the main copy also. By doing this, the collaboration database enables full history and audit capabilities.

The management system also includes an index for fast free text context aware searches. In this case, collaboration database users will have the ability to search their items. Queries such as "item with description containing the word 'scrabbled egg'" or "item with type='customer' related to item with type='purchase' are trivial samples of the search capabilities that the collaboration database will support/permit. To achieve the expected search level, each stored item will be marked and indexed (using a dedicated mechanism). The index data as modeled is provided by the calling application. Additionally, the collaboration database and the management system will automatically identify metadata to index, such as relations between documents. On top of these search capabilities, each search will be context aware, which means each search will return to the users only results that are aligned with the user context. As an example, assume there is an item with three versions, where user 1 works on version 3, and user 2 works on version 2. When user 1 is searching, the search engine will return only data from versions in a context associated with user 1 (e.g. user 1's work area and public data in version 3), and user 2 will perform searches only on versions in user 2's context and will not see changes in version 3.

The management system also may include, a state store to maintain user roles, collaboration groups, configurations, and user states.

With respect to atomic commitment, the collaboration database may be implemented utilizing several subsystems, each one with its own mathematical and physical constraints. Each item update might have effects on the data part stored in a sub component. The collaboration database operations are atomic, which means the change will be reflected on all related subsystems or fail. To achieve the atomicity, a consensus manager algorithm may be used (e.g. as two phase commit or other atomic commit protocol, etc.) to track the update state on all subsystems and make sure the atomic update was achieved in a timely manner, or otherwise the update may be rolled-back.

In one embodiment, the management system may have four user roles, three of which can manage data stored in the system and the fourth can only manipulate user data and permeations and perform some administrative works. For example, the system may have administrative user roles including a system admin that can: delete items (hard delete); perform maintenance jobs of the different stores; and manage some user oriented activities.

The management system may have operative user roles including a viewer, contributor, and owner. In this case, a viewer can view a granted item in read only mode. On top of the viewer capabilities, a contributor can also edit the item data. On top of contributor capabilities, the owner can assign users to the different roles on the item.

Figure 4:
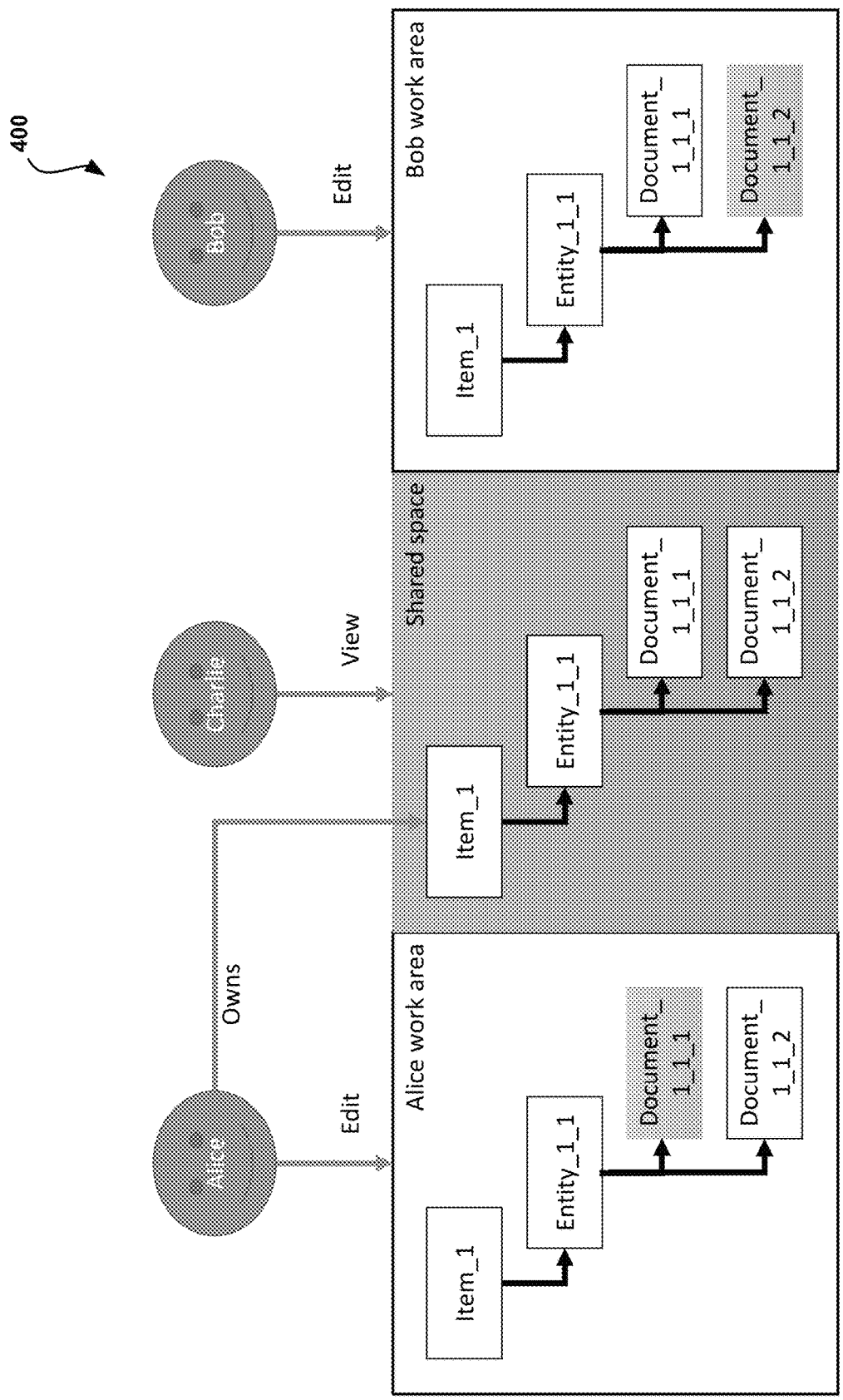
FIG. 4 shows an example of a system collaboration schematic, in accordance with one embodiment.

FIG. 4 shows an example 400 of a system collaboration schematic, in accordance with one embodiment. As an option, the example 400 may be viewed in the context of the details of the previous figures and/or any subsequent figure(s). Of course, however, the example 400 may be viewed in the context of any desired environment. Further, the aforementioned definitions may equally apply to the description below.

As an example, there may be two users in the system, Alice and Bob. Alice creates a new item named "theItem". Alice is now the owner of theItem. As Alice starts editing theItem and the management system creates a workspace version of the item so Alice's work will not affect any other user. When Alice is happy with her work, she can merge it to the shared copy. When Alice needs some assistance in her work, she grants Bob a collaborator role on her item. The management system creates a workspace version of the item for Bob.

At this stage Alice and Bob can edit the item, each one in their own workspace version, and when they are happy with their changes, they can share it with each other using the shared version. The management system will take care of the merge process using fast-forward merging and conflict resolution (e.g. automatic, manual, etc.) when something is inconsistent. If Alice grants Charlie a viewer role, Charlie can view the shared version.

The only point at which Alice cares about breaking another user's work is when she shares her changes with the other item's collaboration group. By the nature of collaborative work, it can happen that Alice is more advanced in her work than Bob in such manner that her share will break some logical interfaces she worked on with Bob (i.e. she might break Bob's work in some cases). This behavior is expected when collaborating and the collaboration database will not validate the inserted data.

To achieve high availability, in one embodiment, each of the subcomponents of the management system (or the collaboration database) may be clustered and data may be replicated across the cluster. Cluster size and replication factor may be set by the collaboration database configuration.

Collaboration database user operations may be masked from the physical layer and may not have any knowledge about the actual high availability infrastructure. Instead, the user operations may use a single entry point with internal load balancing and health check capabilities.

In one embodiment, the collaboration database may use active-standby schematics with high availability in each site to achieve geo redundancy. Whenever an item is updated successfully to the active site, the collaboration database may replicate the data to the standby (and located in another geography) site. If the update fails, the collaboration database may give it some tolerance and retry writing at additional configurable times. If all the retries fail, an alert of the unstable state may be sent to the admin.

In the case of an active site fail, the standby site will become active and will serve the users. When the active site is restored, the new data will be synched into it. It is possible to have more than one standby site. In this case, the collaboration database configuration will maintain the order in which sites become active.

Each collaboration database item will belong to a tenant. Each collaboration database user will have permissions to act in one tenant or more. Tenants may be used to encapsulate items by some business logic maintained by the collaboration database admin. The management system will also have commonality to other solutions (e.g. high availability, geo redundancy, and multi-tenancy, etc.).

Thus, the management system including the collaboration database maintains collaboration capabilities at the item level with versioning merging and allows context aware searches in the system level.

Figure 5:
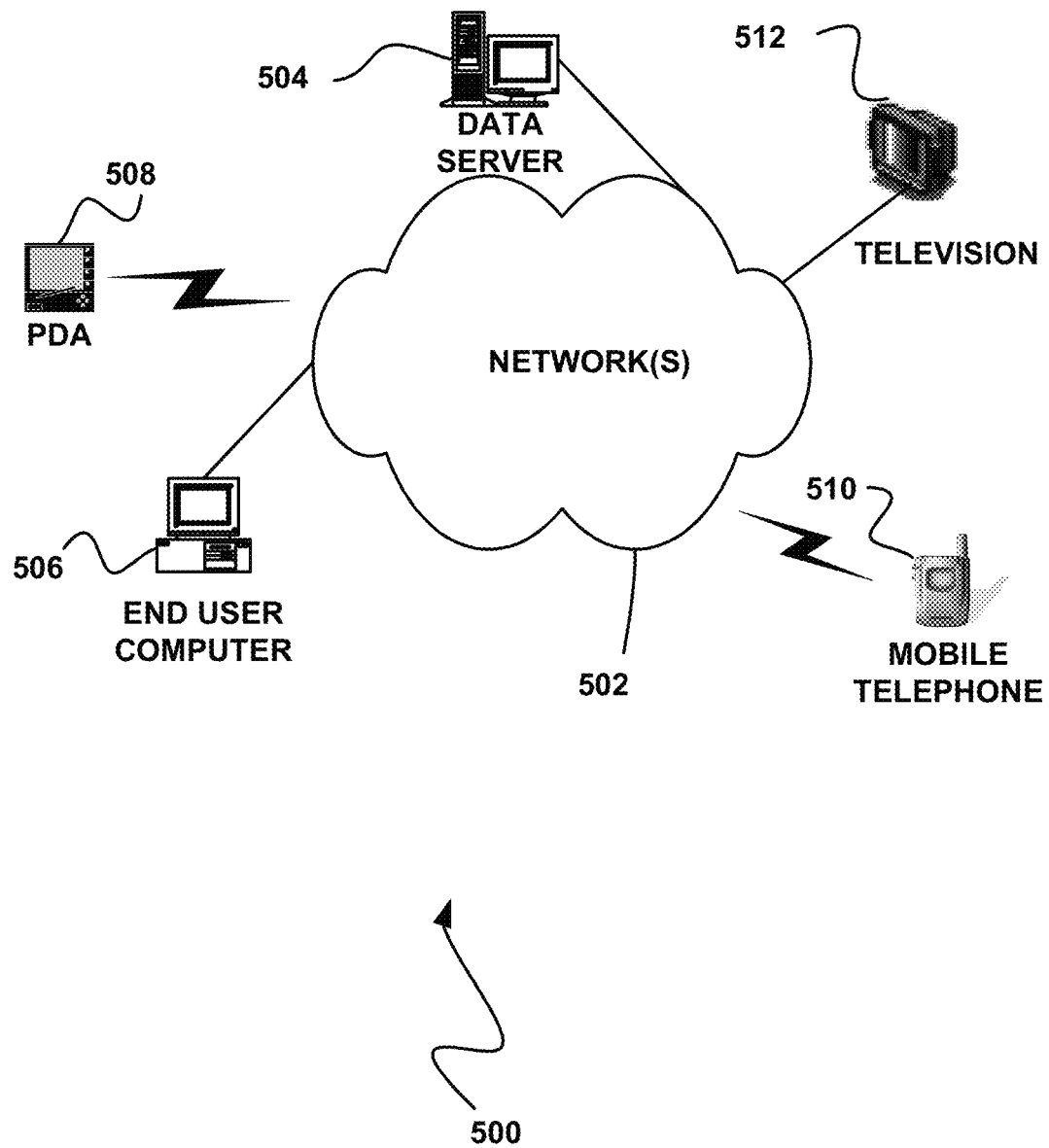
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
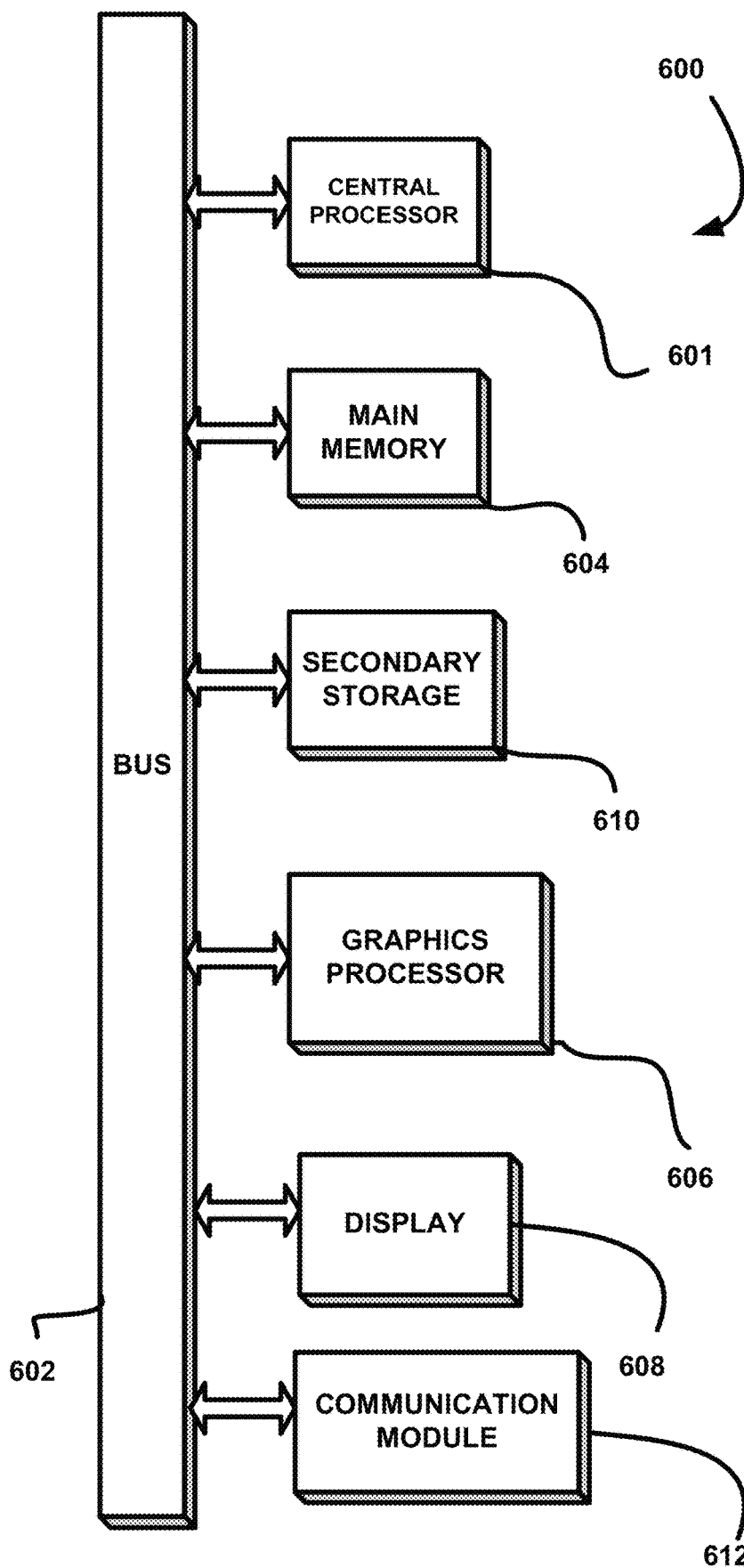
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 606.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a shared document for a plurality of users to collaborate work;
   defining, by the system, user roles for the plurality of users associated with the shared document, the user roles including at least one owner role and one or more viewer roles or contributor roles;
   creating, by the system for each user of the plurality of users, a private work area with a copy of the shared document for allowing a corresponding user to work on the copy of the shared document and create a change set for the shared document;
   determining, by the system, that a first user of the plurality of users shares the private work area of the first user back to the shared document;
   responsive to the determining, initiating, by the system, fast-forward merging for the shared document including merging the change set to the shared document;
   detecting, by the system, one or more conflicts that occurred during the fast-forward merging and that were not resolved during the fast-forward merging;
   responsive to the detecting, performing, by the system, downstream merging for the shared document including merging the shared document into the private work area of each user of the plurality of users and resolving the one or more conflicts that occurred during the fast-forward merging and that were not resolved during the fast-forward merging;
   after performing the downstream merging, repeating the performing, by the system, of the fast-forward merging for the shared document;
   providing, by the system, context aware searching for use by the plurality of users including responsive to receipt of a search query by a second user of the plurality of users, returning only search results from the private work area of the second user and from public data in a version of the shared document worked on by the second user.

2. The method of claim 1, wherein the system constructs items from the shared document.

3. The method of claim 1, wherein the system constructs items from entities included in the shared document.

4. The method of claim 1, wherein the system includes an index for free text context aware searches.

5. The method of claim 1, wherein the system includes a state store to maintain the user roles.

6. The method of claim 1, wherein the system includes a state store to maintain collaboration groups.

7. The method of claim 1, wherein the system includes a state store to maintain item assignments.

8. A computer program product embodied on a non-transitory computer readable medium, comprising computer code for:
   identifying, by a system, a shared document for a plurality of users to collaborate work;
   defining, by the system, user roles for the plurality of users associated with the shared document, the user roles including at least one owner role and one or more viewer roles or contributor roles;
   creating, by the system for each user of the plurality of users, a private work area with a copy of the shared document for allowing a corresponding user to work on the copy of the shared document and create a change set for the shared document;
   determining, by the system, that a first user of the plurality of users shares the private work area of the first user back to the shared document;
   responsive to the determining, initiating, by the system, fast-forward merging for the shared document including merging the change set to the shared document;
   detecting, by the system, one or more conflicts that occurred during the fast-forward merging and that were not resolved during the fast-forward merging;
   responsive to the detecting, performing, by the system, downstream merging for the shared document including merging the shared document into the private work area of each user of the plurality of users and resolving the one or more conflicts that occurred during the fast-forward merging and that were not resolved during the fast-forward merging;
   after performing the downstream merging, repeating the performing, by the system, of the fast-forward merging for the shared document;
   providing, by the system, context aware searching for use by the plurality of users including responsive to receipt of a search query by a second user of the plurality of users, returning only search results from the private work area of the second user and from public data in a version of the shared document worked on by the second user.

9. The computer program product of claim 8, wherein the system constructs items from the shared document.

10. The computer program product of claim 8, wherein the system constructs items from entities included in the shared document.

11. The computer program product of claim 8, wherein the system includes an index for free text context aware searches.

12. The computer program product of claim 8, wherein the system includes a state store to maintain the user roles.

13. The computer program product of claim 8, wherein the system includes a state store to maintain collaboration groups.

14. The computer program product of claim 8, wherein the system includes a state store to maintain item assignments.

15. A system, comprising one or more processors, operable for:
   identifying, by the system, a shared document for a plurality of users to collaborate work;

defining, by the system, user roles for the plurality of users associated with the shared document, the user roles including at least one owner role and one or more viewer roles or contributor roles;

creating, by the system for each user of the plurality of users, a private work area with a copy of the shared document for allowing a corresponding user to work on the copy of the shared document and create a change set for the shared document;

determining, by the system, that a first user of the plurality of users shares the private work area of the first user back to the shared document;

responsive to the determining, initiating, by the system, fast-forward merging for the shared document including merging the change set to the shared document;

detecting, by the system, one or more conflicts that occurred during the fast-forward merging and that were not resolved during the fast-forward merging;

responsive to the detecting, performing, by the system, downstream merging for the shared document including merging the shared document into the private work area of each user of the plurality of users and resolving the one or more conflicts that occurred during the fast-forward merging and that were not resolved during the fast-forward merging;

after performing the downstream merging, repeating the performing, by the system, of the fast-forward merging for the shared document;

providing, by the system, context aware searching for use by the plurality of users including responsive to receipt of a search query by a second user of the plurality of users, returning only search results from the private work area of the second user and from public data in a version of the shared document worked on by the second user.

16. The method of claim 1, wherein the shared document is replicated across a plurality of sites including an active site and at least one standby site.

17. The method of claim 16, wherein when an item is updated successfully to the active site, data is replicated to the at least one standby site.

18. The method of claim 16, wherein when the active site fails, one standby site of the at least one standby site is made active to serve the plurality of users.

19. The method of claim 18, wherein the at least one standby site is a plurality of standby sites, and wherein a configuration maintains an order in which the plurality of standby sites become active.

20. The method of claim 18, wherein when the active site is restored, new data is synched to the active site.

\* \* \* \* \*